Figure 1:
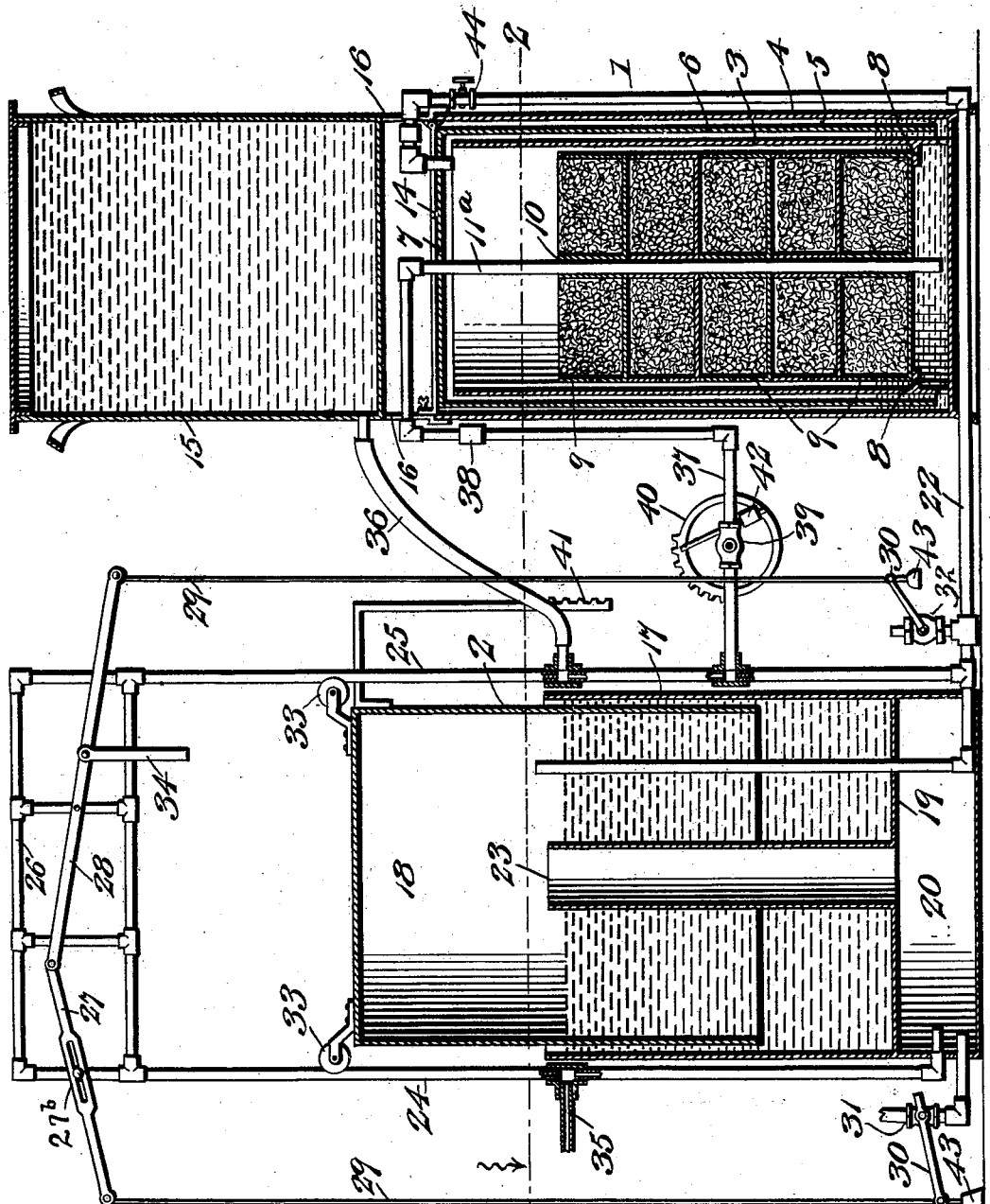

No. 694,587. Patented Mar. 4, 1902.
L. T. STEPHENSON.
ACETYLENE GAS GENERATOR.
(Application filed Nov. 15, 1900.)

(No Model.) 2 Sheets—Sheet 1.

Witnesses
Edwin G. McKee
Louis G. Julihn

Levi T. Stephenson Inventor
By
Attorney

No. 694,587. Patented Mar. 4, 1902.
L. T. STEPHENSON.
ACETYLENE GAS GENERATOR.
(Application filed Nov. 15, 1900.)
(No Model.) 2 Sheets—Sheet 2.
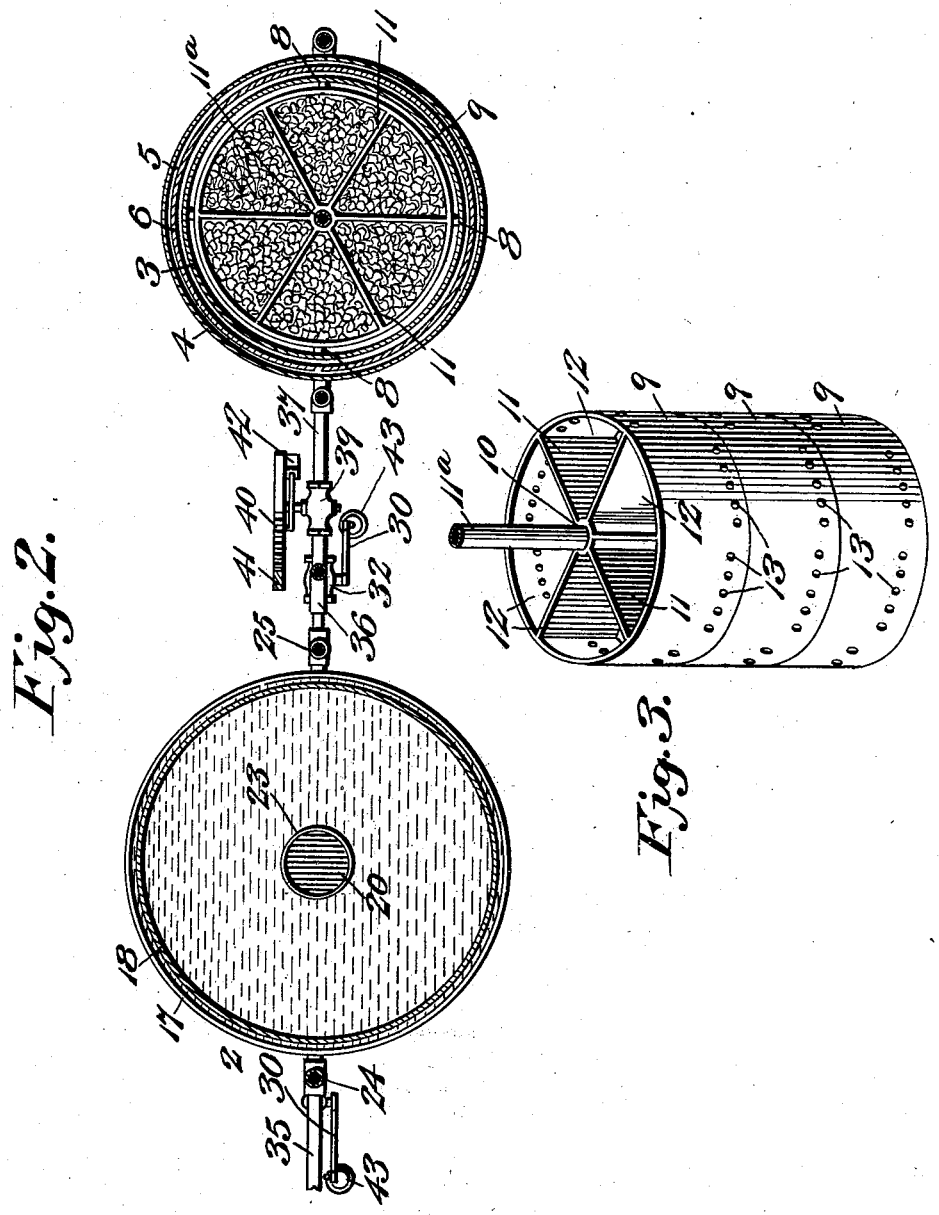

UNITED STATES PATENT OFFICE.

LEVI T. STEPHENSON, OF TRINIDAD, COLORADO, ASSIGNOR, BY DIRECT AND MESNE ASSIGNMENTS, OF ONE-HALF TO JOHN N. TURNER AND RICHARD J. WILLIAMS, OF TRINIDAD, COLORADO.

ACETYLENE-GAS GENERATOR.

SPECIFICATION forming part of Letters Patent No. 694,587, dated March 4, 1902.

Application filed November 15, 1900. Serial No. 36,644. (No model.)

*To all whom it may concern:*

Be it known that I, LEVI T. STEPHENSON, a citizen of the United States, residing at Trinidad, in the county of Las Animas and State of Colorado, have invented a new and useful Gas-Generator, of which the following is a specification.

My present invention relates to improvements in gas-generators, or more particularly to that class of devices employed for the generation and storage of acetylene gas by the decomposition of calcium carbid.

The object of the invention is to simplify the construction of the generator and to render the operation thereof purely automatic by the employment of a series of carbid-chambers, cartridges, or charge-holders arranged in a novel manner for successive use as the gas generated from the carbid within the preceding holders is exhausted from the gasometer constituting a part of the apparatus and provided with means controlled by the gas-bell for automatically regulating the supply of water to the generating-chamber and for regulating the gas-pressure by effecting the blow-off of the gas both from the generator and gasometer when the pressure exceeds a predetermined limit.

To the accomplishment of the objects stated and others subordinate thereto, all as will hereinafter more fully appear, the invention consists in the construction and arrangement of parts to be described, illustrated in the accompanying drawings, and defined in the appended claims.

In said drawings, Figure 1 is a sectional elevation of the apparatus complete. Fig. 2 is a sectional view on the line 2 2 of Fig. 1, and Fig. 3 is a perspective view of a series of carbid-holders disposed upon the hollow core or pipe.

Referring to the numerals of reference employed to designate corresponding parts throughout the views, 1 indicates the generator, and 2 the gasometer, of my apparatus, the former being designed for the generation of gas and the latter for the storing thereof and for the automatic control of the operation of the generator.

The generator 1 comprises concentric inner and outer shells 3 and 4, of any desired cross-sectional contour, defining an intermediate water-chamber 5, holding a water seal for an inverted cover 6, the side wall of which extends between the shells, with its end wall 7 closing the generating chamber or compartment defined within the inner shell 3. Adjacent to the bottom of the generating-chamber the inner shell 3 is provided with apertures $3^a$ and above said apertures with inwardly-extending brackets 8, which serve as supports for a series of carbid-holders 9, disposed one above the other and each provided with an axial opening 10 for the reception of a hollow core or water-pipe $11^a$, extending downwardly through the cover 6 and terminating below the bottom holder, as indicated in Fig. 1. It is evident, therefore, that water supplied to the generator through the pipe $11^a$ will be discharged below the lowest carbid-holder of the series and will escape through the openings $3^a$ in the shell 3 to form a water seal for the generating-chamber by submerging the lower edge of the inverted cover 7 before the level of water reaches a sufficient height to attack the carbid. Therefore the necessity for paying any attention to the water seal before beginning the generation of gas is obviated, and it is rendered impossible to effect the generation of gas within the generator before a sufficient water seal has been provided. Furthermore, it will appear that as the level of water rises and attacks successive cartridges the depth of the water seal will be correspondingly increased to resist the increasing gas-pressure. Each of the carbid-holders 9 is subdivided by radiating partitions 11 into a number of individual charge-holders 12, each of these chambers or holders being capable of holding a quantity of carbid from which may be generated sufficient gas to fill the gasometer. The wall of each carbid-holder is pierced by a number of apertures 13, related in a manner to permit the ingress of water to the charge holders or chambers successively as the water reaches successive levels—that is to say, these openings are so arranged that as the level of the water is raised it will be permitted to enter the chambers of a holder in succession, and subsequently the several chambers of the superposed holders in order until the entire quantity of carbid within the generator has been decomposed. The special utility of the axially-disposed water-pipe 10 will now be apparent, since the walls of the holders must be slightly removed from contact with the shell 3 in order to permit the water to rise around the holders and enter the openings. This position of the holders is accurately maintained by the pipe 11ª, which constitutes a centering-core serving to accurately center the holders to facilitate the entrance of the water to the interior thereof for decomposing the carbid. The cover 6 of the generator is retained against movement by a cover-retaining bar 14, detachably secured at its opposite ends to the upper edge of the shell 4 and extending diametrically across the cover.

The water designed for the supply of the generator is retained within a superposed reservoir 15, mounted upon suitable brackets 16, upstanding from the shell 4. The manner in which the water is fed from the reservoir to the pipe 10 I shall not now describe, but shall proceed with the description of the gasometer, the construction of which is intimately allied with the provisions which I have made for regulating the feed of water to the generator.

The gasometer comprises the shell 17 and the inverted gas-bell 18, the latter being extended into the shell 17 to be sealed by water contained within a water-chamber defined above a transverse partition 19, located a suitable distance above the bottom of the shell 17 to define an intermediate drier or drying-chamber 20. Gas generated within the generating-chamber passes therefrom through a gas-supply pipe 22, piercing the end wall of the cover 6 and led into the gasometer to discharge the gas within the bell at a point above the liquid-level. The gas thus delivered is designed to pass through a cooling-chamber 23, supported axially upon the partition 19 and opening at one end into the gas-bell and at its opposite end into the drier 20. At opposite sides of the gasometer are erected a pair of hollow standards 24 and 25, connected at their upper ends above the bell by a transverse frame 26, upon which are pivoted a pair of connected controlling-levers 27 and 28, to the outer ends of which are attached connectors 29, secured to the valve-levers 30 of blow-off-valves 31 and 32, arranged, respectively, upon the wall of the drier and upon a nipple extending laterally from the supply-pipe 22 at a point intermediate of the generator and gasometer. The lever 27 has a loose pivotal mounting by providing it with a slot 27ª, engaged by a pin 27ᵇ, projecting from the standard 24. The levers 27 and 28 are designed to be operated for the purpose of blowing off the gas by the rise of the bell 18, which latter is guided between the standards 24 and 25 by guide-rollers 33, contacting therewith, and strikes against a pendent trip 34, which in an obvious manner operates the levers and opens the blow-off valves 31 and 32. The standards of the gasometer are preferably constructed of piping in order that they may be utilized for the conveyance of water and gas. The lower end of the standard 24 is placed in communication with the drier 20 for the conveyance of gas to the gas-main or service-pipe 35, and a portion of the standard 25 is utilized in similar manner for the conveyance of water from the reservoir 15 to the pipe 10. For the latter purpose the standard 25 is provided with a pair of pipe-fittings disposed at different elevations. To the upper connection is attached a pipe 36, leading from the reservoir, and to the lower connection is similarly attached a pipe 37, joined by a union 38 to a horizontally-extending portion of the pipe 10. It will now appear that water will be supplied from the reservoir to the pipe 10 for delivery to the carbid-holders; but provision must be made for regulating the supply of water in accordance with the pressure of gas in the gasometer. Since this pressure is determinable by the position of the gas-bell, the movement of the latter is utilized for the purpose of regulating the water-supply. This end is attained by providing a controlling-valve 39 in the pipe 37 and having its stem connected to a toothed wheel 40, arranged for engagement by a toothed rack 41, pendent from a bracket movable with the gas-bell. Thus as the gas-bell ascends under the increasing pressure of gas the rack 41 engages the toothed wheel 40 to turn the latter and close the valve, thereby cutting off the water-supply from the generator. As the gas-bell continues to ascend the rack moves out of engagement with the toothed wheel, which is retained in its set position by a gravity-slide 42, freely movable upon a guide-bar 42ª, disposed across the inner side of the wheel, and should the quantity of water already supplied to the generator be sufficient to accumulate an abnormal pressure of gas within the gasometer the gas-bell will finally contact with its trip 34 to swing the levers 27 and 28 and open the blow-off valves 31 and 32. As soon now as the gas-pressure has been reduced to a predetermined point the gas-bell will recede from contact with the trip 34 to permit the closing of the blow-off valves by weights or equivalent devices 43, carried by the valve-levers 30. The consumption of the gas by the system will obviously lower the gas-pressure within the gasometer, compelling the latter to gravitate until finally the rack 41 again engages the toothed wheel 42, reversing the latter sufficiently to open the water-valve for the purpose of supplying water to the generator for the decomposition of another charge of carbid. 44 indicates a controlling-valve in the gas-pipe 22 for the purpose of preventing the escape of gas from the gasometer when it is necessary to recharge the generator.

From the foregoing it will be observed that

I have produced a simple, effective, and entirely automatic gas generating and storing apparatus embracing the utilization of a large number of carbid-charge holders arranged in horizontal series and in superimposed tiers for successive use as the level of water within the generating-chamber is gradually raised; but, while the present embodiment of my invention is believed at this time to be preferable, I wish to reserve the right to effect such changes, modifications, and variations as may fall properly within the scope of the protection prayed.

What I claim is—

1. In a generator, the combination with a generating-chamber, a seal-chamber in communication with the generating-chamber, and a carbid-holder in the generating-chamber, of a cover extended into the seal-chamber to a plane below the carbid-holder, and a water-supply pipe common to both the carbid-holder and cover and disposed to supply a water seal for said cover prior to supplying water for the decomposition of carbid within the holder, said pipe being extended into the generating-chamber to retain the carbid-holder in position.

2. A gas-generator comprising a generating-chamber, a seal-chamber in communication therewith, and a series of carbid-holders located within the generating-chamber and provided with apertured outer walls, a cover extended into the seal-chamber to a plane below the carbid-holders, a hollow imperforate core extended through the series of carbid-holders, and means for feeding water to the interior of the generating-chamber at a point below the holders through said core to form a water seal before the carbid is attacked.

3. A gas-generator comprising a generating-chamber, a seal-chamber in communication therewith, a series of carbid-holders within the generating-chamber, a cover for the generating-chamber, said cover being extended into the seal-chamber to a point below the carbid-holders, a hollow core passed through the series of holders and discharging therebelow to supply a water-seal for the cover before the carbid is attacked, a water-reservoir disposed above the chamber and in communication with the hollow core, and means intermediate of the core and reservoir for regulating the water-supply.

4. A gas-generator comprising a generating-chamber, a seal-chamber in communication therewith, a series of carbid-holders arranged in superposed series in the generating-chamber, a cover extended into the seal-chamber to a point below the carbid-holders, a hollow core extending axially through the series of holders to retain said holders in coaxial relation and arranged to discharge water into the chamber below the series of holders to form a seal for the cover before the carbid is attacked, a water-reservoir, a pipe leading from said reservoir to the hollow core, a valve located in said pipe for controlling the water-supply, a gasometer, and means carried by the bell of the gasometer for operating said valve.

5. A gas-generator comprising a generating-chamber, a seal-chamber in communication therewith, a series of carbid-holders disposed one above the other within the generating-chamber, each of said holders being subdivided into a series of charge-holders or cartridges and having an exterior wall provided with apertures opposite the various charge-holders and at different elevations, whereby water is caused to attack the carbid charges successively, a cover extended into the seal-chamber to a point below the carbid-holders, a water-pipe extending axially through the carbid-holders to retain the apertured walls of said holders out of contact with the walls of the generating-chamber, said pipe being arranged to discharge below the last holder of the series to form a seal for the cover before the carbid is attacked, and means for storing the generated gas.

6. In a gas-generator, the combination with a generating-chamber defined by inner and outer shells, the inner of which is perforated at or adjacent to its bottom, a series of carbid-holders mounted above and in spaced relation to the bottom of the generating-chamber, a cover closing the upper end of the chamber and extending into the space between the shells and having its lower edge disposed in a plane below the lowest carbid-holder of the series, a water-supply pipe extending axially through the carbid-holders to retain said holders in position, and discharging below them, and means for supplying water to the pipe at a point above the generating-chamber.

7. In a gas-generator, the combination with the generating-chamber, and a carbid-holder supported above and in spaced relation to the bottom thereof, of a seal-chamber surrounding the generating-chamber, a cover closing the upper end of the generating-chamber and having its side wall extended into the seal-chamber to a point below the plane of the carbid-holder, means disposed at the bottom of the generating-chamber for establishing communication between said chamber and the seal-chamber, and a water-supply pipe extending into the generating-chamber from above and terminating below the carbid-holder, said pipe being designed to retain the carbid-holder in proper axial position within the seal-chamber and to supply water which, as its level rises, will first form a seal for the lower end of the cover and will subsequently attack the carbid in the holder, the depth of the water seal being constantly increased as the level of the water rises to attack successive charges of carbid.

8. A gas-generator comprising a bottom, and inner and outer shells rising from the bottom and rigid therewith, the inner shell being provided with apertures immediately above the bottom of the generator, a cover having its side wall extended between the inner and outer wall of the generator and terminating adjacent to the bottom of the seal-chamber defined between said inner and outer walls, a series of carbid-holders supported axially within the generating-chamber, the lower carbid-holder of the series being elevated above the plane of the lower end of the cover, a water-supply pipe extended through the cover and also through the several carbid-holders and terminating in a plane below the lowest carbid-holder of the series, a water-reservoir superposed above the generator, and suitable connections intermediate of the pipe and reservoir.

9. In an apparatus of the character described, the combination with a gas-generator and a gasometer comprising a movable bell, of blow-off cocks for discharging gas from the generator and gasometer, respectively, a pair of connected levers operatively connected to the cocks, one of said levers being provided with a trip located in the path of movement of the bell.

10. In an apparatus of the character described, the combination with a gas-generator and a gasometer in communication therewith, of means for supplying water to the generator, a valve controlling the supply of water, a toothed wheel connected to said valve and provided with a gravity-slide designed to retain the valve in either of two positions, and a toothed rack movable with the bell of the gasometer and designed to engage the toothed wheel to open or close the valve.

In testimony that I claim the foregoing as my own I have hereto affixed my signature in the presence of two witnesses.

LEVI T. STEPHENSON.

Witnesses:
J. W. CORBETT,
T. M. COMPTON.